US011554969B2

(12) United States Patent  
Grubb et al.

(10) Patent No.: US 11,554,969 B2  
(45) Date of Patent: Jan. 17, 2023

(54) REACTIVE TREATMENT CELL AND SYSTEMS FOR ENVIRONMENTAL REMEDIATION

(71) Applicant: AquaBlok, Ltd., Toledo, OH (US)

(72) Inventors: Dennis Gregory Grubb, Lansdale, PA (US); John H. Hull, Ottawa Hills, OH (US)

(73) Assignee: AquaBlok Ltd., Swanton, OH (US)

( * ) Notice: Subject to any disclaimer, the term of this patent is extended or adjusted under 35 U.S.C. 154(b) by 923 days.

(21) Appl. No.: 14/452,662

(22) Filed: Aug. 6, 2014

(65) Prior Publication Data

US 2015/0041409 A1 Feb. 12, 2015

Related U.S. Application Data

(60) Provisional application No. 61/912,792, filed on Dec. 6, 2013, provisional application No. 61/864,177, filed on Aug. 9, 2013.

(51) Int. Cl.
*C02F 1/00* (2006.01)
*B09C 1/00* (2006.01)
(Continued)

(52) U.S. Cl.
CPC .................. *C02F 1/00* (2013.01); *B09C 1/00* (2013.01); *B09C 1/002* (2013.01); *C02F 1/281* (2013.01);
(Continued)

(58) Field of Classification Search
None
See application file for complete search history.

(56) References Cited

U.S. PATENT DOCUMENTS

| | | | | |
|---|---|---|---|---|
| 4,472,086 A | * | 9/1984 | Leach ................... | C09K 17/00 404/70 |
| 4,842,448 A | * | 6/1989 | Koerner .................. | B09C 1/06 405/128.35 |

(Continued)

FOREIGN PATENT DOCUMENTS

| | | |
|---|---|---|
| GB | 2396170 A | 6/2004 |
| GB | 2466862 A | 7/2010 |

(Continued)

OTHER PUBLICATIONS

PCT International Search Report and Written Opinion, Application No. PCT/US2014/050036 dated Nov. 25, 2014.

(Continued)

*Primary Examiner* — Jonathan M Peo
(74) *Attorney, Agent, or Firm* — MacMillan, Sobanski & Todd, LLC (57) ABSTRACT

Reactive treatment cells (RTCs) are described in combination with sediment capping systems as a means for environmental remediation. RTCs include an impermeable housing defining an interior, a permeable ceiling and floor typically including filtration materials such as geotextiles, and at least one interior compartment for treatment reagents. One RTC includes a gabion-like cage structure retaining a geomembrane-supported geosynthetic clay liner (GM-GCL) housing, while a second embodiment includes a hard, cylindrical shell as a replaceable reagent cartridge. RTCs may be employed in initial capping system installations or retrofitted into existing capping systems. RTCs may include optional baffles, flow restrictors, floating discs, sensor probes, and two or more serial reagent zones or compartments.

18 Claims, 6 Drawing Sheets

(51) Int. Cl.
*C02F 1/28* (2006.01)
*C02F 3/00* (2006.01)
*C02F 101/10* (2006.01)
*C02F 101/16* (2006.01)
*C02F 101/20* (2006.01)
*C02F 101/30* (2006.01)
*C02F 101/32* (2006.01)
*C02F 101/36* (2006.01)
*C02F 103/06* (2006.01)

(52) U.S. Cl.
CPC .............. *C02F 1/283* (2013.01); *C02F 1/288* (2013.01); *C02F 3/00* (2013.01); *C02F 2101/10* (2013.01); *C02F 2101/103* (2013.01); *C02F 2101/105* (2013.01); *C02F 2101/16* (2013.01); *C02F 2101/163* (2013.01); *C02F 2101/20* (2013.01); *C02F 2101/30* (2013.01); *C02F 2101/306* (2013.01); *C02F 2101/32* (2013.01); *C02F 2101/322* (2013.01); *C02F 2101/327* (2013.01); *C02F 2101/36* (2013.01); *C02F 2101/363* (2013.01); *C02F 2103/06* (2013.01); *Y10T 29/49716* (2015.01); *Y10T 29/49826* (2015.01)

(56) References Cited

U.S. PATENT DOCUMENTS

| | | | |
|---|---|---|---|
| 4,984,594 A * | 1/1991 | Vinegar | B09C 1/06 |
| | | | 134/1 |
| 4,998,848 A * | 3/1991 | Hansen | E21B 43/082 |
| | | | 405/128.6 |
| 5,263,795 A * | 11/1993 | Corey | B09C 1/002 |
| | | | 405/128.25 |
| 5,281,332 A * | 1/1994 | Vandervelde | B01D 24/008 |
| | | | 210/151 |
| 5,487,622 A * | 1/1996 | Cherry | B09C 1/002 |
| | | | 210/170.07 |
| 5,538,787 A | 7/1996 | Nachtman et al. | |
| 5,676,207 A * | 10/1997 | Simon | B09C 1/00 |
| | | | 166/266 |
| 5,730,558 A | 3/1998 | Holland | |
| 5,782,580 A * | 7/1998 | Aubert | B09C 1/00 |
| | | | 405/128.5 |
| 5,897,946 A | 4/1999 | Nachtman et al. | |
| 6,171,984 B1 * | 1/2001 | Paulson | D03D 13/006 |
| | | | 405/107 |
| 6,386,796 B1 | 5/2002 | Hull | |
| 6,558,081 B2 | 5/2003 | Hull | |
| 6,688,812 B2 * | 2/2004 | Rowe | B09B 1/00 |
| | | | 405/129.7 |
| 7,011,766 B1 | 3/2006 | Hull | |
| 7,438,500 B2 | 10/2008 | Hull | |
| 2007/0235381 A1 * | 10/2007 | Tsai | C02F 1/003 |
| | | | 210/287 |
| 2008/0245710 A1 * | 10/2008 | Mitchell | E03F 5/0404 |
| | | | 210/85 |
| 2008/0264546 A1 * | 10/2008 | Olsta | E02D 31/004 |
| | | | 156/91 |
| 2009/0169311 A1 | 7/2009 | Sharley et al. | |
| 2010/0050905 A1 | 3/2010 | Lewis et al. | |
| 2011/0017648 A1 * | 1/2011 | Burkhardt | E03B 3/00 |
| | | | 210/170.07 |

FOREIGN PATENT DOCUMENTS

| | | |
|---|---|---|
| JP | H10-102485 A | 4/1998 |
| JP | 2000/064326 A | 2/2000 |
| WO | 9322241 | 11/1993 |
| WO | 9429749 A1 | 12/1994 |
| WO | 2012048215 A2 | 4/2012 |

OTHER PUBLICATIONS

"AquaBlok 2080FW/PONDSEAL", AquaBlok, 2012, www.aquablok.com.
"AquaBlok About Us, Corporate History", AquaBlok, 2012, www.aquablok.com , accessed May 2, 2013.
"EHC Original ISCR Reagent", FMC Environmental Solutions, 2013, http://environmental.fmc.com/solutions/soil-ground-remediation/ehc-iscr-reagent accessed May 8, 2013.
"Geomembrane Supported Geosynthetic Clay Liners", GSE Environmental, 2012, GSEworld.com.
"MAR Systems' Sorbster Media", Material Safety Data Sheet, 2011, www.marsystemsinc.com, accessed on May 8, 2013.
"Reactive Core Mat", CETCO, AMCOL International, 2012, http://remediation.cetco.com/LeftSideNavigation/products/ReactiveCoreMat/tabid/1359/Dec . . . , accessed May 3, 2013.
"System Overview", Triton Costal & Waterway Systems, Tensar International, 2010, pp. 1-15.
"The Contaminated Sediment Challenge", Remediation: Contaminated Sediments In-situ Treatment and Capping Innovations, CH2MHill, AquaBlok, 2013, ch2mhill.com/remediation.
"Triton Marine Mattresses", CETCO, AMCOL International, 2012, http://remediation.cetco.com/LeftSideNavigation/products/TritonMarineMattresses/tabid13 . . . , accessed May 3, 2013.
Extended European Search Report, Application No. 14834997.0, dated Mar. 24, 2017.
European Communication pursuant to Article 94(3) EPC, Application No. 14834997.0, dated Apr. 28, 2021.

* cited by examiner

REACTIVE TREATMENT CELL AND SYSTEMS FOR ENVIRONMENTAL REMEDIATION

This application claims priority to provisional application 61/864,177 filed Aug. 9, 2013 and to provisional application 61/912,792 filed Dec. 6, 2013.

BACKGROUND OF THE INVENTION

This invention generally relates to a reactive treatment cell (RTC) for environmental remediation, including remediation, or the removal of, contaminants from environmental media, non-limiting examples of which include sediment, groundwater, and/or vapors or gasses. In particular, this invention relates to combining the reactive treatment cell, which may be equipped with exchangeable reagent cartridges, with new or preexisting sediment capping systems.

Sediment capping remediation systems mitigate the migration of contaminants through sediments where they may negatively impact water quality, which may have significant adverse affects on human health, a wide variety of aquatic organisms including those subsisting at the sediment-water interface, wildlife and the environment. Here, through a variety of uptake mechanisms, contaminants may enter the base of the food chain, which has many implied ecological receptor and human health risks. Contaminants include organic pollutants (e.g., pesticides, insecticides, herbicides, polynuclear aromatic hydrocarbons (PAHs) including chlorinated compounds such as polychlorinated biphenyl (PCB), volatile organic compounds (VOCs), organic solvents, and/or non-aqueous phase liquids (NAPL)) and inorganic pollutants (e.g., heavy metals such a mercury and arsenic, ammonia, nitrates, and/or phosphates).

The specific sediment capping strategy that is ultimately deployed depends on many factors. Currently, both passive (impermeable) and active (reactive) sediment capping systems are being developed to accommodate a wide variety of site-specific issues, demands and conditions.

A non-limiting example of a common site issue includes addressing the potential for upwelling of contaminated groundwater and/or NAPLs and ebullition gasses through a layer of sediment and into the overlying water column or surface water. Such upwelling may be caused by a variety of forces, including advective flows, excess pore water generated by sediment consolidation and/or gas production as a result of biological degradation or chemical reactions. Positive pore water pressures associated with excessive geotechnical overburden pressures, and the upwelling of contaminated groundwater and/or NAPL and gasses have the ability to destabilize impermeable sediment caps and lower the geotechnical stability thereof. Facilitating the dissipation of positive pore water pressures may correspond to an increased localized advective flow, or horizontal transport, of contaminated groundwater and/or NAPL through a non-preferred flow path, which may substantially diminish the efficiency and/or effective design life of reactive sediment capping remediation systems.

A situation may therefore arise where the reactive sediment capping remediation system is over-designed in order to avoid labor and costs associated with the removal and replacement thereof, as well as delays in time associated with obtaining government environmental permits and approvals. A further complication may arise where significant quantities of expensive treatment reagents that are used in reactive sediment capping remediation systems are bypassed and never contacted, potentially resulting in the daylighting of untreated contaminated groundwater into surface water.

A further problem may arise when the waterway or environmental area is of limited depth and/or width, such as a canal, slough, or channel, thus limiting the effective area over which laterally flowing contaminated groundwater and/or NAPL may flow along a preferred or remedial path prior to daylighting.

Accordingly, there exists a need to integrate reactive treatment cells into new and pre-existing, passive and active sediment capping systems in order to address various issues that may be associated therewith, as well as to extend the life, increase the efficiency, and/or broaden the range of applications of such sediment capping systems.

Currently, at least two main active/reactive sediment capping systems are commercially available for sediment capping remediation: (1) the REACTIVE CORE MAT® sediment capping system commercially sold by CETCO and others; and (2) the AquaBlok®/AquaGate™ or Blended Barrier™/AquaGate™ (AB/AG or BB/AG) sediment capping systems commercially sold by AquaBlok, Ltd.

The REACTIVE CORE MAT® (RCM) is a generic treatment reagent delivery platform in the form of a permeable composite mat that is primarily composed of at least one reactive filler material sandwiched between two non-woven fabric geotextile materials and typically furnished in standard roll widths of 15 feet. Non-limiting examples of the reactive filler material include granular porous treatment reagents, activated carbon, apatite, organoclay, organoclay montmorillonite, and combinations thereof. An organoclay (OC) treatment reagent is frequently used as the reactive filler material and is reported to be effective at NAPL immobilization and eliminating organic sheens while allowing the passage of water. Non-limiting examples of the geotextile materials include polypropylene (PP), high density polyethylene (HDPE), and combinations or copolymers thereof. An advantage of the RCM is that its porous nature allows for the dissipation of positive pore water pressures associated with upwelling groundwater over its entire surface, unless its ability to transmit water is reduced due to swelling/ingress of NAPL or due to clogging by fines or biofilms. An additional advantage of the RCM is that its thin, lightweight profile minimizes overburden pressures on soft underlying sediments while maximizing the available water column thickness in shallow waters, such as canals. Multiple RCM layers, of the same or different composition, can be positioned at or near the sediment surface to accommodate a variety of contaminant loading scenarios. The RCM may be used in combination with a protecting or "armoring" layer, such as a TRITON® marine mattress.

A TRITON® marine mattress (MM) system is traditionally composed of a planar rock-filled reinforced geogrid material. The TRITON® MM system can be lined with a geotextile fabric material and also filled with at least one reactive filler material. Non-limiting examples of the reinforced geogrid material and/or the geotextile fabric material include materials polypropylene (PP), high density polyethylene (HDPE), and combinations or copolymers thereof. Traditional designs of the Triton® MM system use natural quarried aggregates or natural river-rock of up to several inches in diameter, and it is understood that various industrial by-products, recycled and/or composite particles of similar size could be likewise incorporated. Non-limiting examples of the reactive filler material include granular materials (such as crushed apatite, limestone, slags, and crushed concrete, etc) and/or composite porous treatment reagents, activated carbon, apatite, organoclay, organoclay montmorillonite, and combinations thereof, either in bulk or as amendments to AquaBlok® or Blended Barrier™ materials. The TRITON® MM system can be used as a ballast layer and/or an armoring layer for armoring passive or active sediment caps and structures associated therewith. For example, a traditional rock-filled TRITON® MM system may be placed above a RCM, and optionally affixed thereto with fasteners, to serve as an armoring layer for protecting the RCM against damage and erosion.

Figure 1:
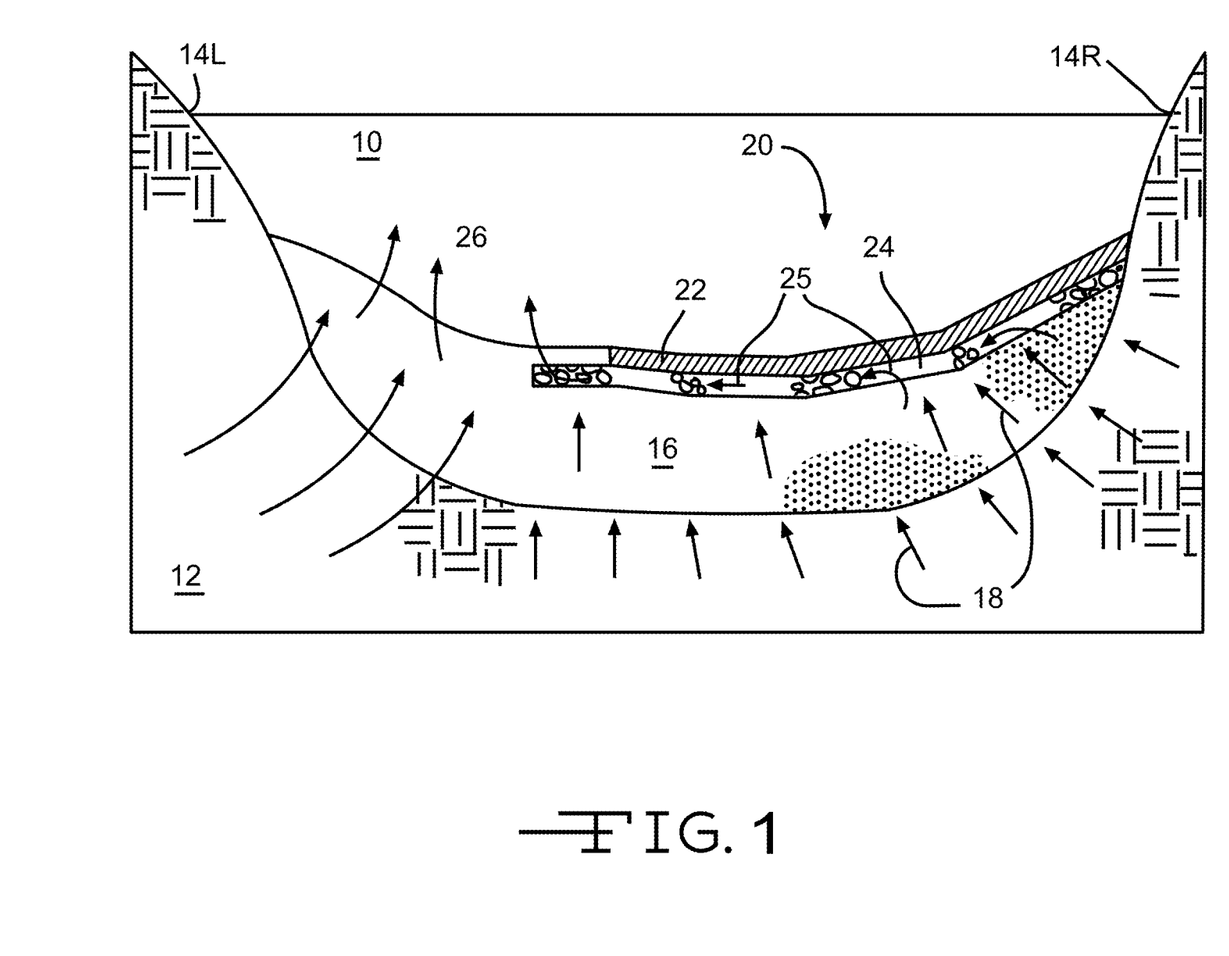
FIG. 1 is a cross-sectional view of an AquaBlok®/AquaGate™ sediment capping system.

FIG. 1 illustrates a body of water 10 supported by ground 12, the ground forming shorelines 14L, 14R at the margins of the body of water 10. A base layer of sediment 16 may collect between the body of water 10 and the ground 12. In situations of contamination, contaminated pore fluids may enter the sediment (shown by plume arrows 18 on the right hand side near the shoreline) and, under upwelling hydrostatic forces, the plume of contamination migrates upward toward the sediment surface. The figure further depicts a "funnel and gate" active sediment capping system 20, having a permeable layer 24 such as AquaGate™, mostly covered by an impermeable layer 22, such as AB, thus comprising an AB/AG capping system. An alternative capping system (not shown) is a Blended Barrier™/AquaGate™ (BB/AG) active/reactive sediment capping system. At some distance from the shoreline 14L (left-hand side), the sediment is no longer impacted by contaminated groundwater and a capping system 20 is no longer required.

The AB/AG and BB/AG systems typically contain at least two different sets of a plurality of composite particles having different properties, each composite particle comprising a core and a sealant layer at least partially encapsulating the core. For example, the AB (passive capping) layer 22 may comprise a set of a plurality of composite particles that form an impermeable barrier, while the AG layer 24 (whether with active treatment or simply drainage blanket) may comprise a different set of a plurality of composite particles that form a permeable and/or filtering layer. See, e.g. U.S. Pat. No. 6,386,796, which issued to Hull on May 14, 2002, U.S. Pat. No. 6,558,081, which issued to Hull on May 6, 2003, U.S. Pat. No. 7,011,766, which issued to Hull on Mar. 14, 2006, and U.S. Pat. No. 7,438,500, which issued to Hull on Oct. 21, 2008, each of which is incorporated herein by reference in their entirety. These active (reactive) sediment capping systems are discussed in more detail herein.

SUMMARY OF THE INVENTION

This invention relates to a reactive treatment cell (RTC) for environmental remediation, including remediation, or the removal of, contaminants from environmental media such as sediment, groundwater, and/or gas. The RTC comprises a housing including an impermeable side wall that defines an interior cavity, which is adapted to contain one or more treatment reagents; a permeable ceiling layer connected to a top surface of the housing sidewall; and a permeable floor layer connected to a lower surface of the housing sidewall, the permeable floor layer adapted for receiving and permitting passage of upwelling ground or pore fluids into the interior cavity of the housing. The permeable ceiling layer typically comprises a geogrid outer ceiling layer and a non-woven geotextile inner ceiling layer.

The housing is impermeable, typically having a conductivity of $1 \times 10^{-7}$ cm/sec or less. The housing may comprise a GCL supported by a gabion-like reinforcing cage, or the housing may comprise a shell of plastic or other material. The interior of the RTC is adapted to contain treatment reagents in one or more interior compartments or zones which may be separated by geotextiles or similar permeable fabrics or materials. The RTC may be equipped with an exchangeable reagent cartridge containing one or more replaceable treatment reagents for treating and removing contaminants from pore fluids.

This invention also relates to a RTC having the capacity to incorporate at least one environmental sensing probe, which may be equipped with an energy source and a radio frequency transmitter, for sampling, measuring and/or monitoring an environmental condition and transmitting information about the condition to a remote receiver. Conditions that may be measured and/or monitored in this way include: the absence, presence or concentration of contaminants in environmental media; determining the quality or approximating the remaining life of one or more treatment reagents (e.g., composite particles) present within the RTC or the exchangeable reagent cartridge; or determining the quality or approximating the remaining life of one or more reactive media (e.g., composite particles) present within an active/reactive sediment capping system.

This invention also relates to systems and methods for incorporating the RTC into a sediment capping system to treat contaminated pore fluids, dissipate positive pore water pressure associated with upwelling groundwater that may develop in sediment located below the sediment capping system, address ebullition of gas, and treat contaminants contained therein or being released therefrom, and/or extend the life, increase the efficiency, and/or broaden the range of applications of new and/or pre-existing sediment capping systems.

In still another aspect, the invention relates to method and systems for redirecting the flow of contaminated pore fluids in order to better utilize the full capacity of treatment layers that already exist or that are installed concurrently.

The foregoing discussion exemplifies certain aspects of the present invention. Various exemplary aspects of the present invention are discussed in the following detailed description of the invention. Additional aspects of the invention will become apparent to those skilled in the art when the following detailed description is read in light of the accompanying drawings. Accordingly, the following detailed description and accompanying drawings are to be regarded as illustrative in nature, and not as restrictive.

DETAILED DESCRIPTION OF THE INVENTION

As used in this disclosure, certain acronyms and terms have the meanings ascribed below. The term "RTC" means a reactive treatment cell in accordance with an exemplary aspect of the present invention. The term "AB" means AquaBlok®, one example of an impermeable layer of a sediment capping system. The term "AG" means AquaGate™, one example of a permeable layer of a sediment capping system. The term "BB" means Blended Barrier™, which is a blend of an AquaBlok® impermeable barrier and aggregate rock.

The term "RCM" refers to a REACTIVE CORE MAT®, or a structural, hydraulic, and functional equivalent thereof. The term "MM" refers to a TRITON® marine mattress system, or a structural, hydraulic, and functional equivalent thereof.

The term "GG" means a geogrid and the term "NWGT" means a non-woven geotextile, as each of these is further described herein.

The term "GM" means a geomembrane. The term "GCL" means a geosynthetic clay liner. The term "GM-GCL" is understood in the context of this disclosure to mean a geomembrane-supported geosynthetic clay liner.

The term "daylighting" refers to the escape of upwelling groundwater and/or gasses (collectively "pore fluids") to the overlying column or body of water. It will be understood that groundwater may carry with it dissolved contaminants and/or gasses, and is thus a "fluid," and this fluid is filtered through porous media—whether naturally occurring or synthetic—and is thus characterized as a "pore fluid." This is typically in the context of a sediment capping system that includes an impermeable barrier that directs the upwelling pore fluids to a non-contaminated area. Daylighting is depicted in FIG. 1 with arrows 26.

The terms "permeable" and "impermeable" are understood in the context of this disclosure to be with respect to conductivity of fluids; i.e. they refer, respectively, to the properties of materials that permit/block the flow of water, gasses and NAPLs therethrough. Permeability or "hydraulic conductivity" (K) is measured in rates of flow (e.g. cm/sec) as described below.

Reactive Treatment Cells

Reactive Treatment Cells or RTCs comprise three main components: an impermeable housing defining one or more interior chambers, some filtering materials disposed between the interior chamber and the exterior at both floor and ceiling positions, and some decontaminating reagents distributed within the chamber. RTCs may also include other optional features and components. Each component will be described further below. The RTC of the present invention is highly adaptive to combinations with, and incorporation into, an AquaBlok®/AquaGate™ (AB/AG) or Blended Barrier™/AquaGate™ (BB/AG) sediment capping system. The RTC may be combined with an AB/AG or BB/AG sediment capping system during the initial installation thereof. Alternatively, a previously installed or prior existing AB/AG sediment capping system may be retrofitted with the RTC.

The housing component may exist in at least two distinct, non-limiting, exemplary embodiments: one having a housing with a gabion basket construction, and the other RTC having an exchangeable reagent cartridge shell dimensioned to fit into a stationary boot embedded in the sediment.

Figure 2:
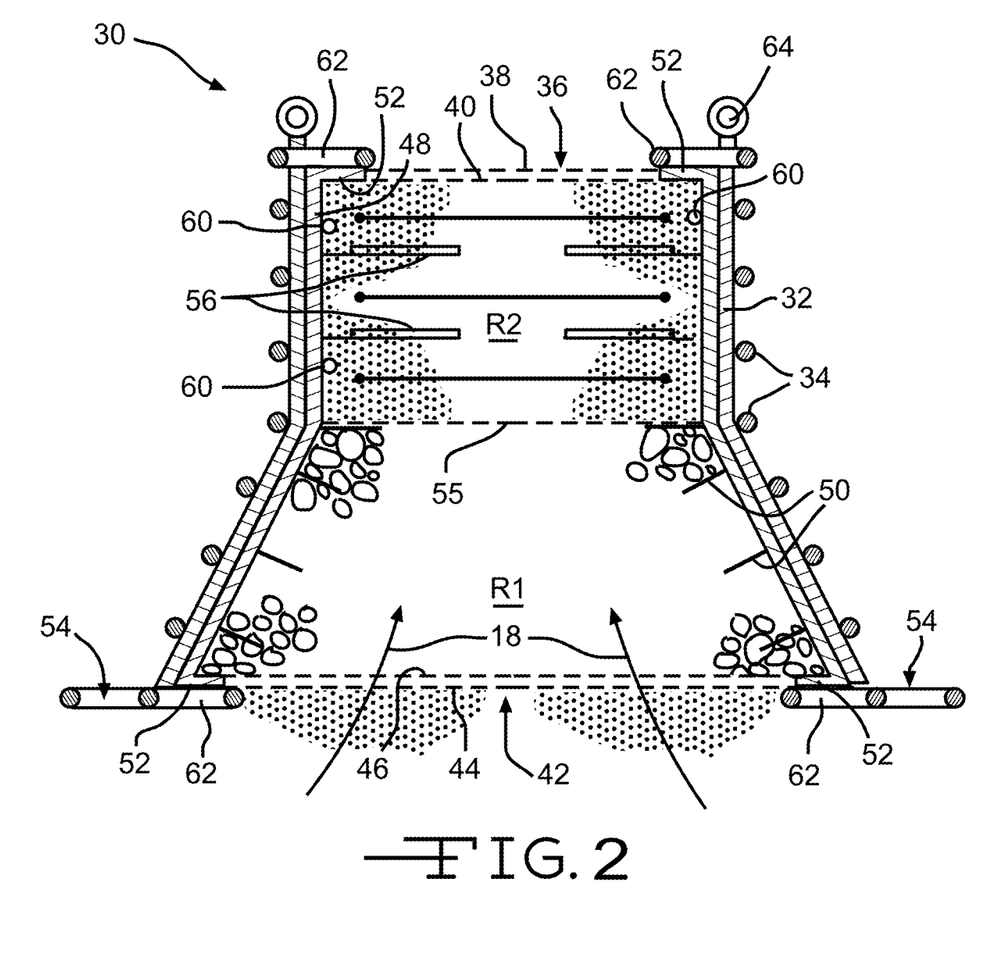
FIG. 2 is a cross-sectional view of one embodiment of the RTC of the present invention.

FIG. 2 is a cross-sectional view of a first embodiment of a RTC 30. The RTC may have any desired size, length, width or diameter, and/or height. It is envisioned that the RTC could be at least about 3.0 feet in diameter, especially where low height profiles of the RTC are desired in shallow water configurations or environments (e.g., canals, channels, streams, sloughs, trenches, etc.).

The RTC may have any desired shape, dimension, configuration, and/or construction. For example, the RTC 30 illustrated in FIG. 2 may have a gabion basket housing construction comprising a reinforcing cage 32, and/or outer reinforcing ribs 34 located on an outer surface of the reinforcing cage 32. The gabion basket may be an inverted bell-shape. Alternative exemplary shapes might include cylindrical-, cone- or cube-shaped. The gabion basket may be composed of any material conventionally used in the art, non-limiting examples of which include plastic and coated plastic.

As shown in FIG. 2, the gabion basket may include a permeable ceiling layer 36 tautly connected to a top surface of the reinforcing cage as a filtration member. For example, the permeable ceiling layer 36 may comprise a permeable geogrid (GG) outer ceiling layer 38 and a permeable non-woven geotextile (NWGT) inner ceiling layer 40.

As shown in FIG. 2, the gabion basket may also include an optional permeable floor 42 layer tautly connected to a bottom surface of the reinforcing cage, wherein the permeable floor layer comprises a permeable geogrid (GG) outer floor layer 44 and a permeable non-woven geotextile (NWGT) inner floor layer 46. The inner NWGT layers 40, 46 serve as filtering materials and allow pore fluids (but not reagents) to pass therethrough, while the outer GG layers 38, 44 provide structural integrity to retain reagent particulate materials R1, R2 within the interior chamber of the RTC 30.

The NWGT may have any desirable apparent opening or mesh size for allowing the passage of groundwater and/or gas (i.e. pore fluids) therethrough, but not NAPLs or sediments. The apparent opening or mesh size of the NWGT will be a design choice based on the specific particle size distribution of the one or more treatment reagents contained within the RTC, and/or the nature of the supporting surface. The supporting surface may comprise the sediment layer, a drainage blanket layer or a permeable layer of composite particles such as an AG layer, the particle size distribution of the underlying composite particles potentially impacting the choice of the opening or mesh size of the optional NWGT.

As shown in FIG. 2, the gabion basket may also include a housing composed of an impermeable inner sidewall 48 located on an interior surface of the reinforcing cage 32. The impermeable inner sidewall of the RTC may comprise a geomembrane-supported geosynthetic clay liner (GM-GCL). The GM-GCL comprises an inner GM facing inwardly toward a chamber and an outer GCL facing outwardly toward the reinforcing cage. The outer GCL may exhibit very low permeability or no permeability, for example a hydraulic conductivity (K) of $1 \times 10^{-7}$ cm/sec or less or $1 \times 10^{-8}$ cm/sec or less, including from $1 \times 10^{-7}$ to $1 \times 10^{-9}$ cm/sec.

The impermeable inner sidewall 48 along with the permeable ceiling and optional floor layers 36, 42 are configured to form a chamber that contains one or more amendments or treatment reagents R1, R2. In other words, the chamber is defined by the impermeable inner sidewall along with the permeable ceiling layer and floor or supporting base material.

A non-limiting example of a GM-GCL includes GSE Environmental's GUNDSEAL® GM-GCL, which comprises a sodium bentonite GCL adhered to a high density polyethylene (HDPE) or linear low density polyethylene (LLDPE) geomembrane (GM), which may be smooth or textured. The HDPE or LLDPE GM has low permeability, provides protection to the sodium bentonite GCL, and improves stability of the composite liner. The sodium bentonite GCL exhibits high swelling and sealing characteristics. A distinct advantage of the outwardly facing sodium bentonite GCL is that it will hydrate and swell to form an excellent seal with the reinforcing cage. Furthermore, once AquaBlok® (AB) or Blended Barrier™ (BB) is placed around the perimeter of the base of the RTC, the outer GCL in combination with AB will hydrate and swell to form an excellent seal to mitigate or prevent short circuiting the flow of contaminated pore fluids along the AB-RTC interface and bypassing of the RTC.

The RTC may optionally include internal baffles 50 to direct the flow of ground (or pore) fluids. For example, the inner geomembrane (GM) of the impermeable inner sidewall 48 can be outfitted with internal baffles 50 to mitigate or prevent short circuiting the flow of groundwater along the impermeable inner sidewall 48 of the RTC and bypassing the one or more treatment reagents R1, R2 contained within the chamber therein. At each end of the GM of the impermeable inner sidewall 48, inward facing lips 52 are present, which may be fashioned and dimensioned to match the internal baffles. The NWGT may be sewn or welded to the GM. The GG can be similarly attached or affixed directly to the reinforcing hoops 62 using a fixing means, such one or more zip ties or a functional equivalent thereof. The reinforcing cage 32 of the RTC can be prefabricated so that that it forms a flange 54 around the perimeter of the RTC, which can then be keyed into an AB or other supporting layer.

The RTC may also be equipped with one or more internal chamber separation NWGTs 55 anchored to select internal baffles 50 to create a plurality of separate reagent zones within the chamber. As illustrated in FIG. 2, through the use of such internal separation geotextiles anchored to select internal baffles, it is possible to have a plurality of separate reagent zones comprising one or more treatment reagents R1, R2 of the same or different composition and/or gradation.

The one or more amendments or treatment reagents R1, R2 contained within the chamber may be any treatment reagent conventionally used in the art of purifying contaminated environmental media, such as contaminated sediment, groundwater, and/or gas. Non-limiting examples of such treatment reagents include AG materials that include amendments such as, powdered activated carbon (PAC), EHC®-M, SORBSTER®, and organoclays designated, respectively, as AG-PAC, AG-EHC®-M, AG-SORBSTER®, and AG-OC. Other amendments could include bioremediating microbes such as are disclosed in provisional application 62/027,356 filed Jul. 22, 2014, which enable self-regenerating remediation system; and/or compounds such as statins that are capable of inhibiting methanogens, especially anaerobic methanogens, that produce methane which facilitates highly toxic methylation of contaminants, such as are described in provisional application 62/024,649, filed Jul. 15, 2014.

In an exemplary embodiment, the first and/or the only treatment reagent R1 that upwelling pore fluid comes into contact with upon entering the base of the RTC is AG-OC.

In alternative exemplary embodiment, the first treatment reagent that upwelling pore fluid comes into contact with upon entering the base of the RTC is AG-OC, BB, or a combination layer of AG-OC and aggregate; and the second treatment reagent R2 that the upwelling pore fluid comes into contact with is AG-PAC. Such layering of the RTC media thus enables sequential treatment of contaminants.

The RTC 30 may also be equipped with one or more flow constrictors 56. Such flow constrictors 56 may be composed of any material conventionally used in the art, a non-limiting example of which includes a polymer (e.g., HDPE). Such flow constrictors 56 may be attached to the internal baffles 50 via an adhesive (e.g., epoxy resin).

The RTC 30 may also be equipped with one or more floating disks 58 which can be placed into the chamber during the treatment reagent packing process to create lateral flow paths that would create a longer flow path and/or increase contact and residence times with the one or more treatment reagents R1, R2 to facilitate the capture and removal of contaminants from upwelling pore fluids.

The RTC 30 may also be equipped with one or more environmental sensing probes 60 for sampling, measuring and/or monitoring an environmental condition, such as the absence, presence or specific concentration of contaminants in pore fluids flowing through the RTC 30. The one or more environmental sensing probes 60 may also be used for measuring the quality, or approximating the remaining life, of the one or more treatment reagents present within the RTC 30 or the exchangeable reagent cartridge. The one or more environmental sensing probes 60 may also be used for indirectly measuring the quality, or approximating the remaining life, of one or more reactive media present within a sediment capping system by sampling, measuring and/or monitoring the absence, presence or concentration of contaminants in pore fluids flowing into the RTC from the sediment capping system. As is understood in the art, such sensor probes likely include a source of power and a transmitter for sending signals to remote receivers.

Each end of the gabion basket may have a reinforced hoop 62 to help carry and support the weight of the RTC 30 and facilitate proper seating of the permeable geotextile/geogrid (NWGT/GG) top and bottom surface layers. As the RTC 30 could be heavy depending on its relative size and the specific type(s) of treatment reagent present therein, the top and bottom reinforcing hoops 62 can be fabricated with lift hooks 64 to facilitate ease of lifting, positioning and installation.

The exemplary bell shape of the RTC provides a smooth transition for the flow of upwelling pore fluids into the RTC from the underlying sediment capping system, as well as facilitates effective sealing or resealing of the RTC with the AB layer of the AB/AG sediment capping system.

The upwelling pore fluids (i.e. water and/or gas; see arrows 18) pass through the permeable GG-NWGT floor layers 44, 46 upon entering the base of RTC 30 and flow vertically upward through the one or more treatment reagents R1, R2 (e.g., AG composite particles) within the chamber of the RTC 30 where the upwelling pore fluids are further treated, purified and/or polished so as to capture and remove additional contaminants as the pore fluids continue to flow through the one or more treatment reagents prior to passing through the permeable NWGT-GG layers 40, 38 before being released from or exiting the top of the RTC and daylighting into the water column or surface water.

Figure 6:
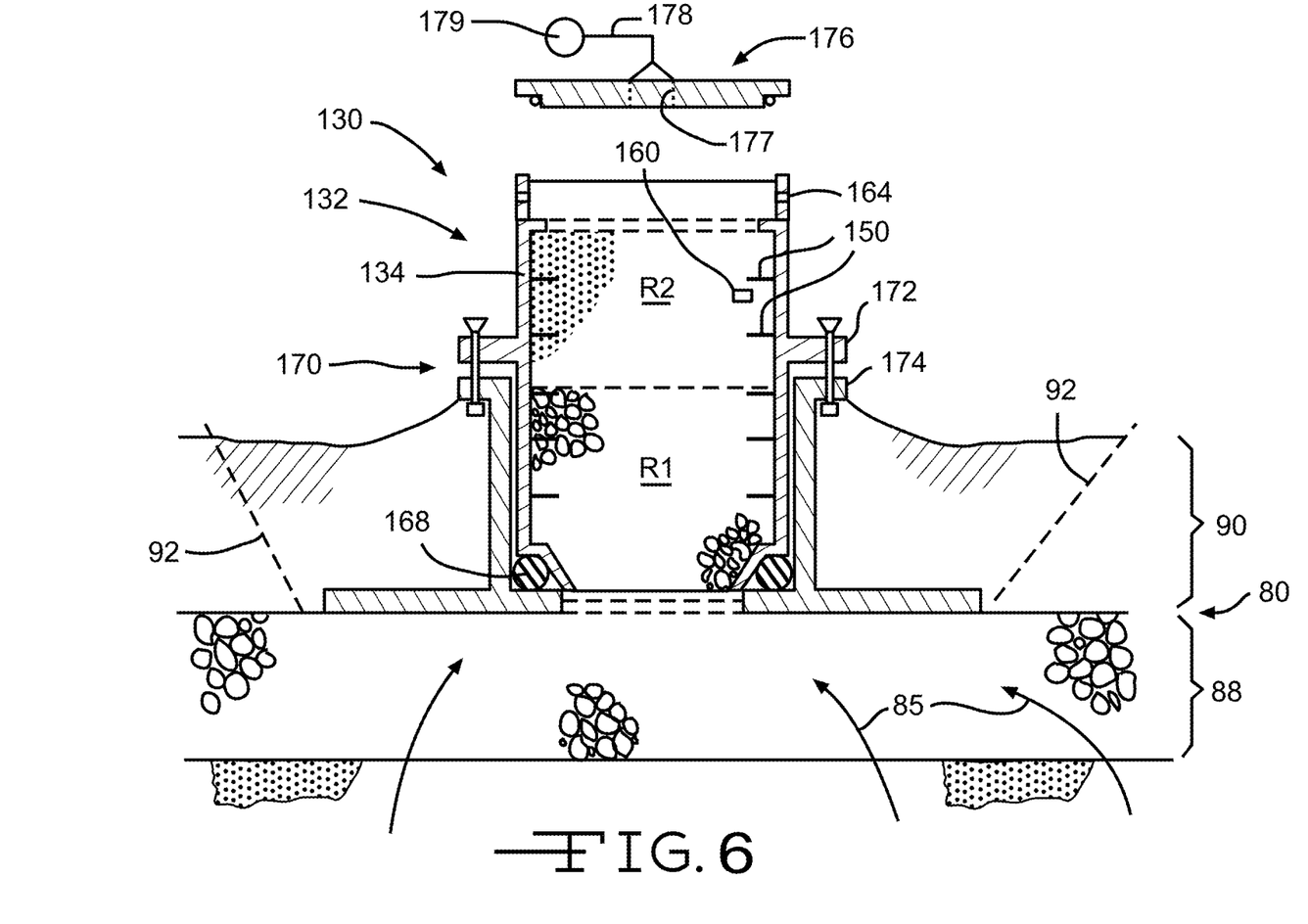
FIG. 6 is a cross-sectional view of a RTC of the present invention, which has an exchangeable reagent cartridge, integrated into an AquaBlok®/AquaGate™ sediment capping system.

FIG. 6 is cross-sectional view of an alternative embodiment of a RTC 130, which has an exchangeable reagent cartridge. This RTC is shown integrated into an AB/AG sediment capping system, substantially as described below in connection with FIGS. 3A and 3B. Specifically, FIG. 6 illustrates a RTC that features an exchangeable reagent cartridge 132 in the form of a rigid column-like shell 134 that is configured to fit snugly into, or be securely seated within, a rigid boot 166 directly positioned on an upper surface of the AG layer 88 or other supporting layer 80. The exchangeable reagent cartridge contains one or more replaceable treatment reagents R1, R2 for treating and removing contaminants from pore fluids. The boot 166 may be semi-permanent or permanent. In an exemplary embodiment, the boot is permanent and thus analogous to a landfill liner penetration detail. The rigid column-like shell 134 of the exchangeable reagent cartridge 132 and/or the boot 166 can be fabricated of any material conventionally used in the art which provides for high chemical resistance, a non-limiting example of which includes HDPE. However, the internal components, as well as the end design features and functions, are analogous to those of FIG. 2. The exchangeable reagent cartridge 132 of the RTC of FIG. 6 is fitted with a seal 168, such as a compressible o-ring or equivalent, which effectively seals the exchangeable reagent cartridge 132 fitted or seated in the boot 166 at the base of the RTC positioned on the upper surface of the AG, BB or drainage layer. An impermeable capping layer 90, such as AB, is placed around the boot 166 over the AG layer 88. The RTC 130 may be installed in a retrofit manner as described below and indicated by dashed excavation lines 92.

Once the exchangeable reagent cartridge 132 is seated in the boot 166, it can be secured using any securing mechanism 170 conventionally used in the art (e.g., screw-down mounts (shown), quick release clamps, or a functional equivalent thereof) which has an ease of use that reflects the ergonomic needs and dexterity of a diver that may be inserting and/or replacing the exchangeable cartridge in the boot. The housing 134 and/or the boot 166 may be fitted with radially extending flanges 172, 174 that comprise part of the securing mechanism 170.

The exchangeable nature of the reagent cartridge 132 permits easy replacement and/or replenishment of amendments or treatment reagents R1, R1. This feature facilitates the tailoring or "fine tuning" of reagent composition to the specific environmental (for example fresh or salt water, warm or cold temperatures, etc) or contaminant needs of the site, thus extending design life before change out is necessary. It also facilitates a sequential use of one amendment or reagent following the use of a different amendment or reagent in a defined remediation plan. Moreover, this replacement of fresh reagents is possible without requiring removal (e.g. excavation and disturbance) and replacement of the AB material surrounding the boot. This may constitute a major advantage in highly contaminated areas. A layer 155 of geotextile or similar permeable fabric or membrane may optionally divide the interior cavity into compartments or zones and serves to separate treatment reagents R1 and R2. More particularly, RTC 130 may include permeable geogrid (GG) outer layers and a permeable non-woven geotextile (NWGT) inner layer, or internal dividing layers, much like the RTC 30 described above. One or more RTCs 130 having an exchangeable reagent cartridge 132 can be located in select or strategic positions within a common body of water (e.g., along a canal). In some installations an array of multiple RTCs may be deployed in a capped contamination zone, and this has particular sampling advantages as described below.

Figure 4:
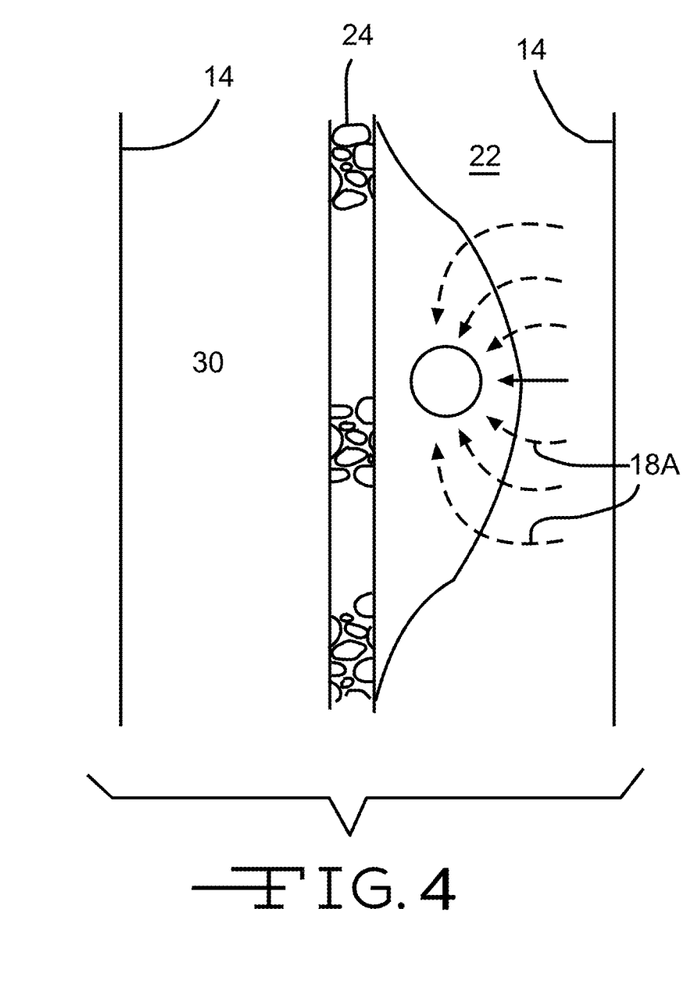
FIG. 4 is a plan view of an AquaBlok®/AquaGate™ sediment capping system (as shown in FIG. 1) which has been retrofitted with a RTC of the present invention (as shown in FIG. 2), and illustrates the ability of this system to redirect local groundwater/pore fluid flow.

The rigid nature of the exchangeable reagent cartridge 132 may allow for lifting hooks 164 and/or a sealable top cap 176, if desired. Use of such a sealable top cap 176 on selected RTCs in an array of multiple RTCs would enable planar redirection of the flow of contaminated pore fluids in the AG layer to other RTC locations, as illustrated in FIG. 4. In another embodiment, the sealable top cap 176 may be fitted with a closeable opening or outlet 177, which may be connected by conduit 178 to a pump 179. In this embodiment, the RTC 130 may be installed and the pump 179 may be used to create a reduced pressure vacuum in the interior of the housing 134, which can facilitate and accelerate the flow of pore fluids through the RTC 130, as well as inducing sediment consolidation as described below.

The exchangeable reagent cartridge 132 may be composed of HDPE or similar material, and may also provide for the attachment or embedment of one or more environmental sensing probes 160 and battery-powered radio frequency emitting devices that could remotely communicate information in real time, or at predetermined specified intervals, with a web-based environmental management system so that RTC exchangeable reagent cartridge change-outs could be scheduled prior to contaminant break through. Optional features such as sensing probes 60, 160, internal flow baffles 50, 150 or discs 58, flow constrictors 56 and two or more reagent compartments may be present in either embodiment of the RTC 30, 130.

Sediment Capping Systems with RTCs

Sediment capping systems per se are known and described in the patent literature (see above description of FIG. 1).

Figure 3A:
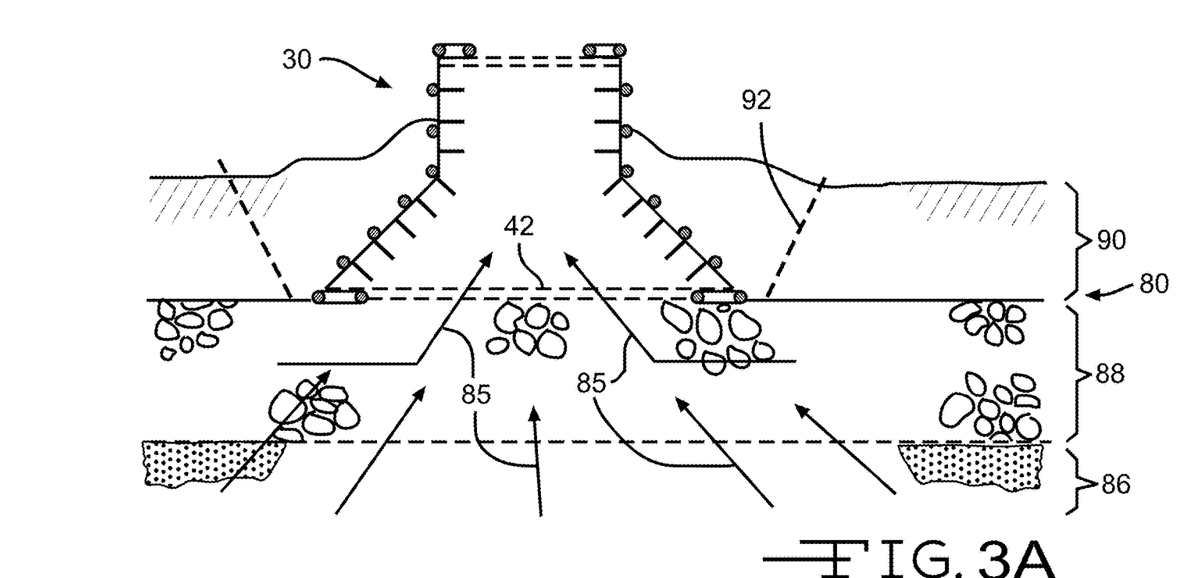
FIGS. 3A and 3B are cross-sectional views of an embodiment of the RTC of the present invention integrated into an AquaBlok®/AquaGate™ sediment capping system (FIG. 3A) or installed directly on a sediment layer (FIG. 3B).

FIG. 3A is a cross-sectional view of a RTC 30 integrated into a supporting layer 80 composed of an AB/AG sediment capping system (i.e. layers 88, 90). The RTC 30 may be combined with an AB/AG or BB/AG sediment capping system during the initial installation thereof. For example, during an initial installation procedure, AG is applied to a sediment surface 86 to form a permeable layer 88 thereon, a RTC 30, 130 is positioned on an upper surface of the permeable layer 88, and an AB or BB layer 90 is applied on an upper surface of the permeable layer 88 and around a perimeter of the RTC to form a seal.

Alternatively, a previously installed or prior existing sediment capping system may be retrofitted with a RTC 30, 130. For example, during a retrofitting procedure of a previously installed or prior existing AB/AG sediment capping system, a section of an AB or BB layer 90 is removed (e.g., excavated) to create a hole that extends to an underlying AG layer 88 or other supporting layer 80. In FIG. 3A, the margins of such a hole are indicated by dashed lines 92. RTC 30 is inserted into the hole and positioned directly on an upper surface of the underlying AG layer 88. The retrofitting procedure typically involves applying fresh (unhydrated) AB composite particles around a perimeter of the RTC, which has been inserted into the hole, so as to complete and seal the AB layer 90 around the perimeter of the RTC.

Therefore, whether the RTC is combined with a sediment capping system during an initial installation procedure, or retrofitted through an AB cap of a previously installed or prior existing sediment capping system, fresh (unhydrated) AB composite particles may be applied around a perimeter of the RTC so as to form and/or reinforce the seal around the perimeter of the RTC along the AB-RTC interface, as shown in FIG. 3A. Upon hydration and swelling of the AB composite particles, a seal or barrier layer 90 is formed and/or reinforced which mitigates or prevents short circuiting the flow of contaminated sediment, groundwater, and/or gas along the AB-RTC interface and bypassing of the RTC.

Figure 3B:
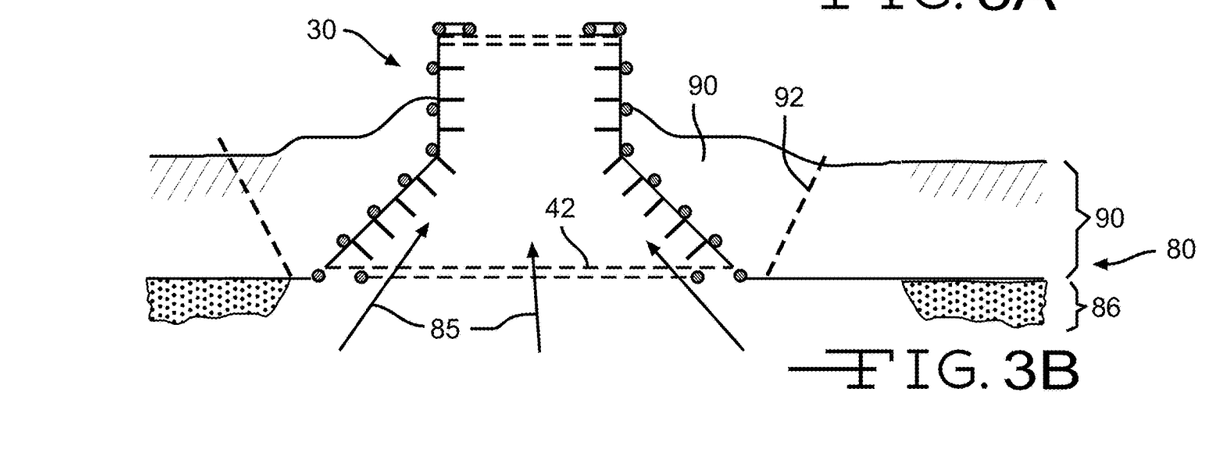

In yet another variation of the system, as illustrated in FIG. 3B, the RTC 30 (or 130 as shown in FIG. 6) of the invention may be installed directly on a supporting layer 80 other than AG. In FIG. 3B, a RTC 30 substantially as described above may be installed (either initially or as a retrofit) directly on a sediment layer 86. In still other variations, the RTC 30 of the invention may be installed on other types of permeable drainage blankets overlying a sediment layer 86. In this way, the RTC may be installed on any "supporting layer" 80 that is permeable enough to allow the flow of pore fluids therethrough. Supporting layers may optionally contain decontaminating reagents, such as adsorbants, clays and other materials described herein. Supporting layers include sediment layers, drainage blankets, aggregate, and composite particle layers such as AquaGate™.

Groundwater and other pore fluids are constrained beneath the impermeable capping layer 90 and are forced to flow into or through the supporting layer 80 (e.g. AG layer 88 or sediment layer 86) en route to the RTC 30 floor as shown by flow arrows 85. With respect to each of the various embodiments of the RTC discussed herein, the RTC may be equipped with various environmental sensing probes 60, 160 for sampling, measuring and/or monitoring various internal conditions of the RTC (in section or plan) and/or the environmental quality of the AG composite particle treatment media of the AB/AG sediment capping system.

FIG. 4 is a plan view of an AB/AG sediment capping system (as shown in FIG. 1) which has been retrofitted with a RTC 30 (as shown in FIG. 2). Because contaminant transport and fate is governed by many factors, there is a possibility that a contaminant plume may not propagate uniformly through the treatment media of the AG layer 24, leaving one or more zones of potentially unused AG composite particles. In order to increase the overall efficiency of the AG layer 24 by using all of its plan area, it may be desirable to breach the AB cap 22 in at least one select or strategic location, insert the RTC 30 into a hole formed in the AB cap 22, position the RTC on the supporting surface, such as the upper surface of the AG layer 24, and re-seal the AB cap 22 as described above. In so doing, the local pore water pressure regime is reduced, which initiates a redirection of the groundwater/pore fluid flow paths toward the RTC 30 as well as to one or more sections of the AG layer containing previously unused AG composite particle treatment media. This re-direction of ground fluid flow is illustrated by arrows 18A in FIG. 4.

Such a breaching activity would involve the removal (e.g., excavation) of a portion or section of the AB cap 22 to create a hole, as suggested in the discussion above relating to FIG. 3. The RTC 30 would then be inserted into the hole and positioned directly on an upper surface of the underlying AG layer 24. Dry, fresh AB composite particles may then be placed around the perimeter of the RTC and allowed to hydrate and swell to effectively reseal the AB/AG sediment capping system. The AB materials removed may be recycled or properly disposed of accordingly.

A further advantage of using RTCs in a contaminated area, particularly an array of multiple RTCs in a large area, is that they can be GPS-located for easier sampling and verification of compliance. With some sediment capping systems, the questions of compliance—how do we know it is working, and where is it working—were difficult to answer. It generally required destructive testing, even penetration of the capping barrier layer, at various locations to know for sure. However, the use of an embedded RTC according to the invention helps in several ways. First, the RTCs may be fitted with ports or sampling access doors, where underwater sampling could take place from specific locations. Alternatively, the RTC's can be fitted with sensors and/or probes to transmit data to the surface regarding the conditions of contamination and remaining reagent life. As mentioned, this transmission may be in real-time or as scheduled. Finally, the precise and immovable location of the RTCs allows pinpointing the GPS locations of the sampling data, whether physical or transmitted. This enables the preparation of a guide map or plan of conditions beneath the cap as regards the flow of contaminants and the conditions of reagents to address the contamination. Such a plan provides three advantages. First, it helps address the compliance questions of whether and where remediation is being effective. Second, it informs the placement of new RTCs as described above in connection with FIG. 4. Third, it also informs the fine-tuning of reagent composition to extend the design life of the RTCs, as described above.

As described herein, combinations of materials may be used in forming either of the two major layers of a capping system. For example, the BB layer of the BB/AG system is itself a blend of AB composite particles with aggregate. Other materials such as slag, clays, sand, mortars, binders, etc. might be used in combination with AB particles for the impermeable layer, which should have a hydraulic conductivity of $1 \times 10^{-6}$ cm/sec or less, including $1 \times 10^{-7}$ cm/sec or less, $1 \times 10^{-8}$ cm/sec or less, and $1 \times 10^{-9}$ cm/sec or less. Similarly, the permeable layer may itself be a combination of materials, such as composite particles in combination with aggregate, slag, sand and/or other drainage blankets or systems. The permeable layer should have a hydraulic conductivity of from about $1 \times 10^{-1}$ cm/sec to about $1 \times 10^{-6}$ cm/sec, including from $1 \times 10^{-1}$ to $1 \times 10^{-5}$ cm/sec, from $1 \times 10^{-1}$ to $1 \times 10^{-4}$ cm/sec, from $1 \times 10^{-2}$ to $1 \times 10^{-6}$ cm/sec, from $1 \times 10^{-2}$ to $1 \times 10^{-5}$ cm/sec, and from $1 \times 10^{-2}$ to $1 \times 10^{-4}$ cm/sec. The combination of different materials in the permeable layer can add variations that impact the degree of permeability as well as the distribution of any active reagents that might be warranted in a particular "active/reactive" capping installation.

Composite Particles

The composite particles used in AB, AB/AG, or BB/AG sediment capping systems are known and described in the art along with various specific embodiments and/or sediment capping systems containing the same. See for reference U.S. Pat. No. 5,538,787, which issued to Nachtman et al. on Jul. 23, 1996, U.S. Pat. No. 5,897,946, which issued to Nachtman et al. on Apr. 27, 1999, U.S. Pat. No. 6,386,796, which issued to Hull on May 14, 2002, U.S. Pat. No. 6,558,081, which issued to Hull on May 6, 2003, U.S. Pat. No. 7,011,766, which issued to Hull on Mar. 14, 2006, U.S. Pat. No. 7,438,500, which issued to Hull on Oct. 21, 2008, and WO 2012/048215 published Apr. 12, 2012, each of which is incorporated herein by reference in their entirety. The particles may have any desired particle diameter, non-limiting examples of which include composite particles having a particle diameter of less than ¾ inches, including ¼-¾ inches, and ¼-⅜ inches.

The core of the composite particles may include a granular piece of stone, rock, gravel, sand, or slag, non-limiting examples of which include a granular piece of crushed limestone or other chemically/physically stable earthen aggregate. The core may have any desired particle diameter, a non-limiting example of which includes a particle diameter of ¼-⅜ inches. The core may be more dense, less dense or equally as dense as the sealant layer. In an exemplary embodiment, the core has a relatively greater density as compared to that of the sealant layer.

The sealant layer of the composite particles may partially or completely encapsulate the core. The sealant layer may include at least one reactive material, non-limiting examples of which include a clay, a water absorbent clay that is readily hydratable and has a high swelling capacity (e.g., a bentonite clay, such as high quality Wyoming-derived sodium bentonite clay containing montmorillonite), an organoclay, a clay mineral (e.g., montmorillonite, illite, kaolinite, and attapulgite), a non-swelling reactive material (e.g., activated carbon), and combinations thereof. The reactive material may be powdered.

The reactive material of the composite particles may comprise one or more proprietary products, non-limiting examples of which include Provect-IR™, a media treatment reagent available from Provectus Environmental Products, Inc. Freeport, Ill., USA, which is a metal remediation compound with a controlled-release feature of integrated carbon and zero-valent iron for in situ treatment and immobilization of soluble metals in groundwater and saturated soil, and/or MAR Systems' SORBSTER® media treatment reagent, which is a product containing aluminum oxide, silicon dioxide, iron oxide, ferric sulfate and iron sulfide, for removing metal contaminants, such as mercury, from water.

When composite particles having a sealant layer of water absorbent clay are exposed to water, the clay readily hydrates and swells to form a continuous seal or barrier layer having extremely low or no water permeability, which is effective for preventing migration, or avoiding leakage, of sediment, groundwater, gas, and/or contaminants there through. The seal or barrier layer may have any desired thickness, a non-limiting example of which includes a seal or barrier layer having a thickness of about 1 to about 4 inches.

The composite particles may have any desired weight percent ratio of sealant layer to core, based on a total weight of the composite particles, non-limiting examples of which include:

| Sealant layer (wt %) | Core (wt %) |
|---|---|
| 5 | 95 |
| 10 | 90 |
| 15 | 85 |
| 20 | 80 |
| 25 | 75 |
| 30 | 70 |
| 35 | 65 |
| 40 | 60 |
| 45 | 55 |
| 50 | 50 |

The composite particles may have any desired dry bulk density, non-limiting examples of which include a dry bulk density of 70-90 lbs/ft$^3$, including 88-90 lbs/ft$^3$ (consolidated) and 83-85 lbs/ft$^3$ (unconsolidated). The composite particles may have a specific gravity of greater than 1.0.

The composite particles may, depending on use, have any desired water permeability or hydraulic conductivity, non-limiting examples of which include a water permeability or hydraulic conductivity (K) of $1\times10^{-1}$ cm/sec or less, including $1\times10^{-3}$ cm/sec or less, $1\times10^{-4}$ cm/sec or less, $1\times10^{-5}$ cm/sec or less, $1\times10^{-6}$ cm/sec or less, $1\times10^{-7}$ cm/sec or less, $1\times10^{-8}$ cm/sec or less, $1\times10^{-9}$ cm/sec, or having a conductivity in the range from $1\times10^{-1}$ to $1\times10^{-6}$ cm/sec, from $1\times10^{-2}$ to $1\times10^{-7}$ cm/sec, from $1\times10^{-3}$ to $1\times10^{-5}$ cm/sec, from $1\times10^{-3}$ to $1\times10^{-9}$ cm/sec, from $1\times10^{-4}$ to $1\times10^{-8}$ cm/sec, from $1\times10^{-4}$ to $1\times10^{-9}$ cm/sec from $1\times10^{-5}$ to $1\times10^{-9}$ cm/sec, and from $1\times10^{-6}$ to $1\times10^{-9}$ cm/sec.

The composite particles may further comprise one or more binders to promote adhesion of the sealant layer to the core. A non-limiting example of the binder includes a cellulosic polymer. The composite particles may further comprise one or more additional layers containing one or more desired materials and having any desired thickness.

The composite particles referenced and described above can of course be custom-formulated to meet unique site-specific demands for a particular project. For example, specific attention to design formulations may be necessary in order to create a long preferential flow path and/or provide sufficient contact and residence times to enable reactions (e.g., sorption, complexation, and/or precipitation) to occur to facilitate the capture and removal of contaminants from pore fluids, particularly when ebullition is the driver. Accordingly, the foregoing discussion regarding the composite particles is for illustrative purposes only and not intended to be limited to the specific aspects exemplified herein, but is to be accorded the broadest reasonable scope consistent with the general principles and features referenced and disclosed herein.

AB and BB composite particles may be characterized by a formulation that emphasizes a high swelling clay reactive material so as to create an extremely low permeability cap or impermeable cap with a hydraulic conductivity (K) of $1\times10^{-7}$ cm/sec or less or $1\times10^{-8}$ cm/sec or less, including from $1\times10^{-7}$ to $1\times10^{-9}$ cm/sec.

On the other hand, AG composite particles may be characterized by a formulation that comprises a core containing a granular piece of stone, rock, gravel, sand or slag that can be at least partially encapsulated within a non-swelling reactive material (e.g., powdered activated carbon, a.k.a. PAC) to produce a porous or permeable treatment material (e.g., a porous or permeable treatment blanket, layer, wall, or similar structure) having a water permeability or hydraulic conductivity (K) of from about $1\times10^{-2}$ to about $1\times10^{-6}$ cm/s, depending on the particle size of the composite particle and the potential for swelling of the reactive material. Permeable composite particles may have permeabilities in sub-ranges within these permeability limits.

The sealant layer of the AG composite particles may comprise a hydratable and/or swellable reactive material (e.g., water absorbent clay) but only in minor amounts in order to avoid substantial swelling of the sealant layer upon exposure to water or moisture, so as not to interfere with and/or inhibit the flow of contaminated pore fluids therethrough.

For example, the AG composite particle may comprise 20 wt. % or less of a hydratable and/or swellable reactive material (e.g., water absorbent clay), based on a total weight of the AG composite particle, in order to avoid substantial swelling of the sealant layer upon exposure to water or moisture. Non-limiting examples of which include 20 wt. % or less, 19 wt. % or less, 18 wt. % or less, 17 wt. % or less, 16 wt. % or less, 15 wt. % or less, 14 wt. % or less, 13 wt. % or less, 12 wt. % or less, 11 wt. % or less, 10 wt. % or less, 9 wt. % or less, 8 wt. % or less, 7 wt. % or less, 6 wt. % or less, 5 wt. % or less, 4 wt. % or less, 3 wt. % or less, 2 wt. % or less, and 1 wt. % or less, of a hydratable and/or swellable reactive material (e.g., water absorbent clay), based on a total weight of the AG composite particle.

The dense, granular nature of the composite particles enables them to be easily and uniformly deployed and deposited through a water column (via Stoke's law) and onto the sediment surface using conventional materials handling equipment. Since a significant amount of water treatment occurs at or near the surface of the composite particle, inclusion of expensive reactive materials into a central core of the composite particle can be avoided.

AB composite particles may be used alone to form an AB passive impermeable capping layer or blended with other aggregate materials to form a BB capping layer. AG composite particles may be used alone to form an AG active/reactive treatment and permeable drainage blanket layer. AB and AG composite particles may be used together in an active/reactive sediment capping system, which may be arranged in an AB/AG layered "funnel and gate" fashion.

Selected Applications and Uses

FIG. 1 is a cross-sectional view of an AB/AG sediment capping system of the type into which a RTC may be retrofitted in accordance with the invention. The upper or overlying AquaBlok® (AB) layer 22 serves as a passive impermeable cap, while the lower or underlying layer 24 (AquaGate™ or AG) may serve as an active/reactive treatment and permeable drainage blanket, enabling a directional horizontal flow (arrows 25) of pore fluids (e.g. gas/water/NAPL).

The AB layer or cap 22 may have any desired thickness, a non-limiting example of which includes about 4 to about 12 inches. The AG layer 24 or drainage blanket may have any desired thickness, a non-limiting example of which includes about 1 inch or more. Of course, the aforementioned thicknesses may be optimized to a particular project having site-specific issues, demands and conditions.

An important feature of the AB and BB (passive impermeable capping) layer 22, 90 is that it "self-keys" or molds to various shapes and objects, including complex or irregularly shaped structural components, to form an effective seal at the interface thereof, in both fresh and saline waters.

An important feature of the AG layer 24, 88 is that it must be more permeable than both the underlying sediment 16 and the overlying AB and BB layer 22, 90 so that the AG layer creates a long preferential flow path 25 and/or provides sufficient contact and residence times to enable reactions (e.g., sorption, complexation, destruction, and/or precipitation) to occur to facilitate the capture and removal of contaminants from pore fluids (e.g. groundwater and/or gas).

As the contaminated pore fluid preferentially flows into and through the AG layer 24, 88, the contaminated pore fluid is actively treated until it daylights at the leftmost extent of the AG layer 24 and enters into the overlying water column 10 or surface water. The exposed section of the AG layer also facilitates the dissipation of positive pore water pressure associated with upwelling pore fluid.

Figure 5:
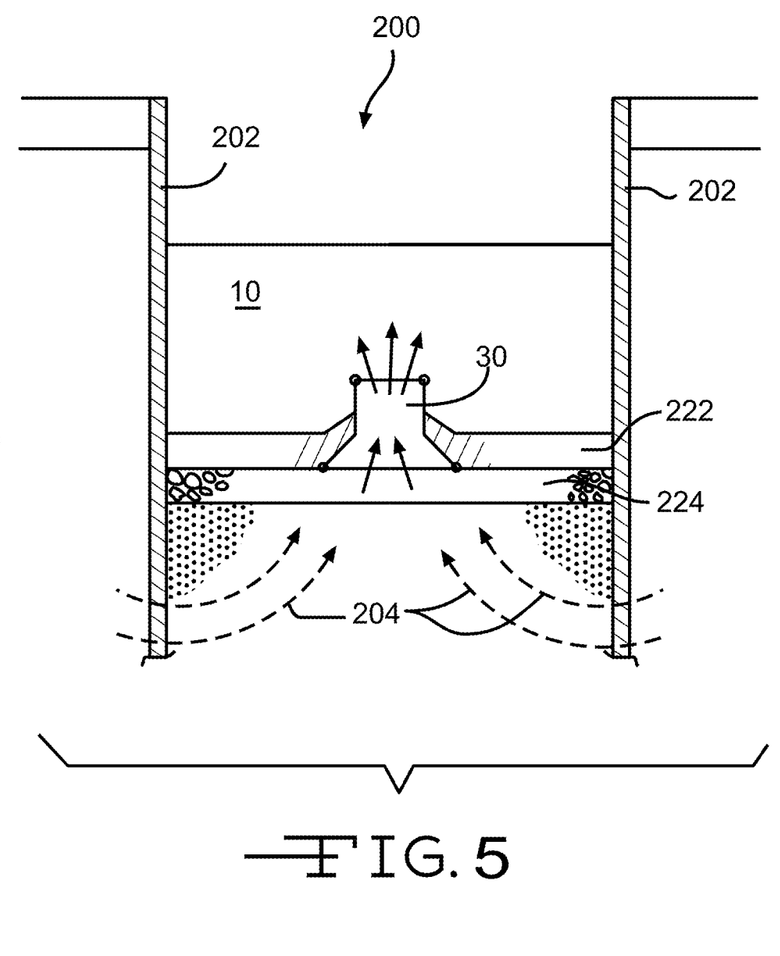
FIG. 5 is a cross-sectional view of a water canal equipped with a RTC of the present invention integrated into an AquaBlok®/AquaGate™ sediment capping system.

FIG. 5 is a cross-sectional view of a water canal 200 equipped with a RTC 30, 130 integrated into a funnel and gate sediment capping system having an impermeable AB layer 222 and a permeable AG treatment layer 224. FIG. 5 illustrates a narrow canal with bulkheads or sidewalls 202 retaining a body of water 10 where the upwelling of pore fluids occurs (e.g. arrows 204) through contaminated sediment which may be impacted. The narrowness of the canal may limit the ability to establish long flowpaths and/or daylighting sections traditionally associated with funnel and gate sediment capping systems, such as the AB/AG system illustrated in FIG. 1.

Upon initial deployment, the RTC shown in FIG. 5 may itself serve as a daylighting section to relieve pore water pressures, while providing additional treatment reagent mass to create a longer flow path and/or increase contact and residence times with the additional treatment reagent mass to facilitate the capture and removal of contaminants from upwelling pore fluids.

A challenge may arise in geometries such as that shown in FIG. 5 where extensive contamination may result in the need for an excessively thick AG treatment layer 224. However, a minimal AB/AG thickness profile is preferred when considering constraints associated with shallow and/or narrow bodies of water (e.g. canals, channels, streams, sloughs, trenches, etc.), a non-limiting example of which includes the maintenance of navigation dredging depth requirements. Accordingly, a need may arise in a shallow and/or narrow body of water for a strategically or selectively placed RTC having an exchangeable reagent cartridge containing one or more replaceable treatment reagents (as described above and illustrated in FIG. 6.) to provide the necessary treatment reagent mass to enable long-term treatment and purification performance.

Figure 7:
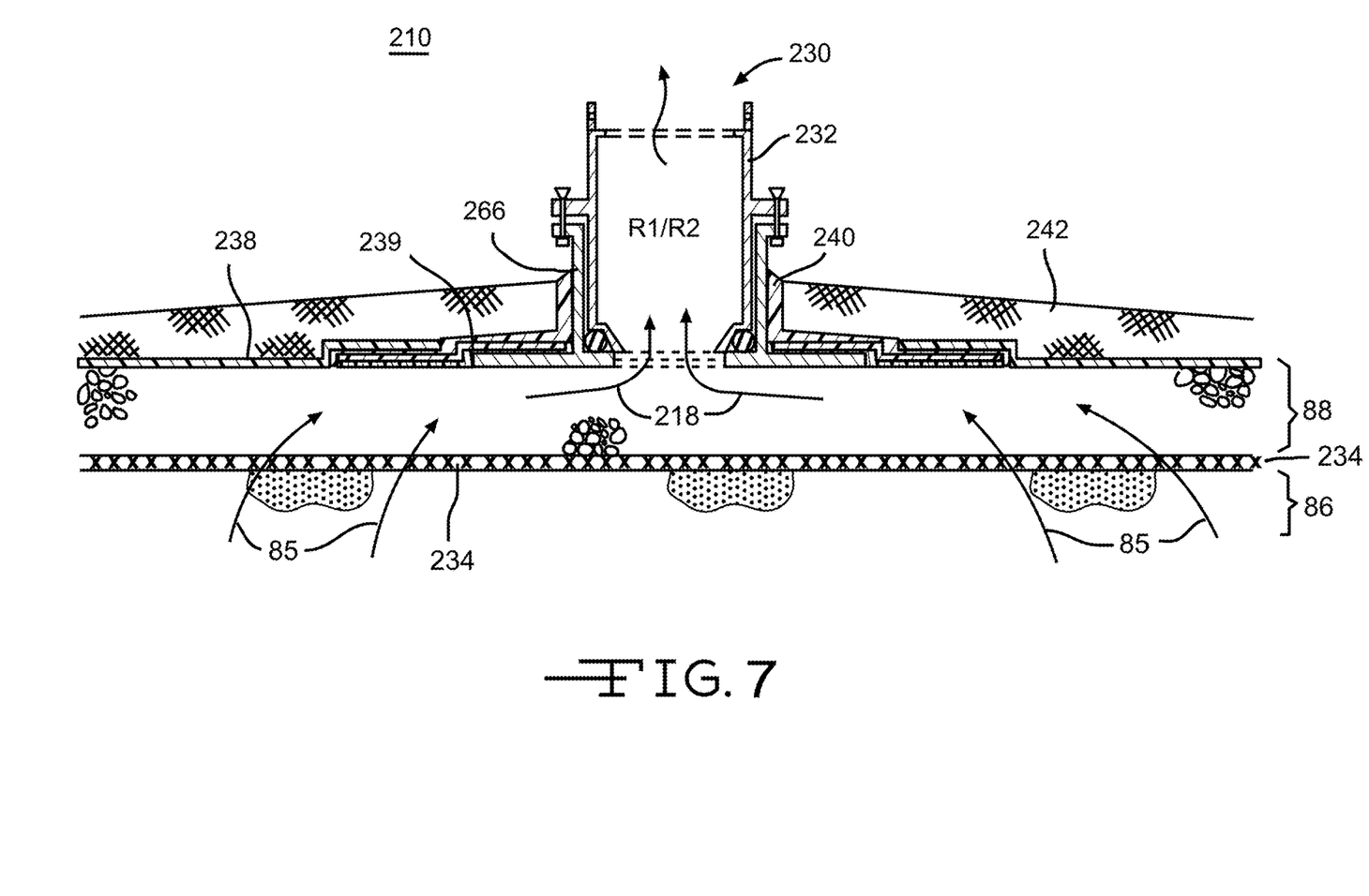
FIG. 7 is cross-sectional view of a reactive capping system complex including a RTC of the present invention, which has an exchangeable reagent cartridge, integrated into a sediment capping system which includes a reactive core mat (RCM), AquaGate™, a geosynthetic clay liner (GCL), AquaBlok®, and/or a TRITON® marine mattress.

The RTC of the present invention may also be used in conjunction with or to retrofit reactive capping systems having Reactive Core Mat (RCM) technology, NWGT separation layers, and/or the functional equivalents thereof. For example, FIG. 7 is cross-sectional view of a reactive capping system complex including a RTC 230 of the housing type having an exchangeable reagent cartridge 232, integrated into a sediment capping system. The RTC 230 is directly positioned on an upper surface of, and in communication with, a permeable treatment and/or drainage layer 88 comprising AG. Alternative permeable layers include a simple drainage blanket or an aggregate layer (e.g. granular pieces of stone, rock, gravel, slag, or sand alone), or any combination of the above. The permeable treatment and/or drainage layer 88 is confined on a lower surface thereof by a RCM 234 or a NWGT separation layer (not shown), and confined on an upper surface thereof (except at the RTC 230) by an impermeable capping layer comprising at least one of a GCL panel 238, a GCL collar 239, and/or AB 240. Contaminated pore fluid flows upward through the RCM 234 (see arrows 85) and laterally through the permeable treatment and/or drainage layer 236 (see arrows 218) and eventually upward into the RTC 230 before daylighting into the overlying body of water 210.

The boot 266 of the RTC may be fitted with a GCL collar 239 that is overlapped by one or more GCL panels 238. The overlap may be of any desired length, a non-limiting example of which includes an overlap of at least 6-12 inches, depending on the expected differential settlement and consolidation of the underlying sediments 286. The boot/GCL collar/GCL panel overlaps, joints, connections, fittings, and/or surrounding/neighboring areas may be sealed with AB composite particles 240 to form an effective seal. An armor and/or ballast layer comprising a TRITON® marine mattress (MM) 242 may assist in maintaining the GCL collar 239 and/or the GCL panel(s) 238 in place, as well as mitigating or preventing erosion of the sediment capping system.

A reactive capping system complex, such as that shown in FIG. 7, may be particularly advantageous in a plethora of various situations and scenarios. For example, at highly contaminated NAPL sites, there may be a need to block or slow upwardly migrating NAPL which makes the use of a RCM attractive. However, high NAPL contamination levels may make the use of layered RCMs inappropriate as the addition of pure treatment reagents to the drainage blanket may be a more effective means to provide the necessary treatment reagent mass for long term effective treatment of dissolved organic compounds. In those cases where a RCM has been deployed on its own and has failed, there may be strong motivation to still make use of its full or remaining treatment reagent mass (akin to FIG. 4), demonstrated ability of the RCM to block NAPL flow, and/or soil separation function. Therefore, leaving the RCM in place and complementing the RCM with one or more of the structures or elements shown in FIG. 7 can be an important strategy to retrofitting the RCM without a risk of contaminant release associated with removing the RCM.

The structures or elements shown in FIG. 7, as well as the arrangement thereof, may be modified to customize or tailor the reactive capping system complex to address unique site-specific demands for a particular project. For example, the one or more GCL panels 238, the GCL collar 239, and/or the TRITON® marine mattress 242 shown in FIG. 7 may be replaced by AB or BB. However, the one or more GCL panels 238, the GCL collar 239, and/or the TRITON® marine mattress 242 may be more suitable than just AB alone where, for example, shallow profiles and/or highly erosion resistant caps are needed.

Of course, the above-mentioned exemplary embodiments are not considered to be all inclusive, but are merely provided to illustrate various and flexible approaches for integrating the RTC of the present invention into sediment capping technologies. As previously discussed, unique site-specific constraints and/or demands for a particular project may facilitate the integration and adaptation of this innovative technology. Furthermore, the ability to modify, replace or exchange the one or more treatment reagents within the chamber, and/or the exchangeable reagent cartridge, of the RTC, or use one or more treatment reagents in a serial configuration to form a "treatment train" so to speak, may render the reactive capping system complex more versatile to address a plethora of various types or combinations of contaminants with different physicochemical properties affecting the absorption characteristic and capture thereof.

The RTC of the present invention may be viewed as complementary to pre-existing sediment capping technologies, rather than as a competing technology since the RTC alone may not necessarily constitute a self standing active/reactive sediment capping system because the RTC may likely not have the necessary surface (or plan) area for treating large bodies of upwelling contaminated groundwater and/or gas.

An additional modification to the structure or configuration of the reactive capping system complex may include installing one or more lateral drains within the sediment or under the constructed cap to facilitate the dissipation of pore water pressures.

In a further variation (as illustrated in FIG. 6), the RTC 130 may also be fitted with an airtight cover or seal 176 to permit a vacuum to be established within the chamber to accelerate the removal of pore fluids from the sediment system. With the introduction of a vacuum created by pump 179 via conduit 178 to opening 177, the buoyant forces of the overlying water column can be dissipated and the water column elsewhere becomes a compacting load on the sediments, thus accelerating sediment consolidation. This may have multiple advantageous effects, including increasing sediment stability, increasing the navigational clearance by increasing the water column thickness (depth), and/or accelerating the removal of pore water from the system, either bypassing the reactive materials within the RTC (for ex-situ treatment) by the use of pre-installed collection tubing, or routing the flow through the RTC.

For example, a RTC may be installed in a capping system without reagents or with minimal reagents initially, sealed for use with a vacuum as described above to consolidate the sediment (and to remove some contaminants and pore fluids), followed by reopening and recharging the RTC with reagents, or replacing the initial cartridge with one containing treatment reagents, for sustained use without a vacuum system.

The principle and mode of operation of this invention have been explained and illustrated with respect to various exemplary embodiments. Of course, this invention may be practiced otherwise than as specifically explained and illustrated herein without departing from its spirit or scope. Accordingly, numerous modifications and variations on the present invention are obviously possible in light of the disclosure and thus the present invention may be practiced otherwise than as specifically described herein without departing from the spirit and scope of the present invention. Therefore, the foregoing disclosure is merely illustrative of various exemplary aspects of the present invention and numerous modifications and variations can be readily made by skilled artisans that fall within the scope of the accompanying disclosure.

Where a closed or open-ended numerical range is described herein, all values and subranges within or encompassed by the numerical range are to be considered as being specifically included in and belonging to the original disclosure of the present application as if these values and subranges had been explicitly written out in their entirety. The upper and lower limits of all numerical ranges are deemed to be preceded by the modifier "about."

All patent applications, patent application publications, patents, scientific and technological literature, publications and references specifically mentioned herein are incorporated herein by reference in their entirety.

What is claimed is:

1. A submersible reactive treatment cell comprising:
a housing including an impermeable sidewall defining an interior cavity, the interior cavity adapted to house one or more treatment reagents capable of treating upwelling pore fluids flowing through the interior cavity;
a permeable ceiling layer connected to a top surface of the impermeable sidewall, the permeable ceiling layer comprising a geogrid outer ceiling layer and a non-woven geotextile inner ceiling layer; and
a permeable floor layer connected to a lower surface of the impermeable sidewall, the permeable floor layer comprising a geogrid outer floor layer and a non-woven geotextile inner floor layer having a permeability adapted for retaining the one or more treatment reagents within the interior cavity during submersion, and for receiving and permitting passage of the upwelling pore fluids into the interior cavity of the housing;
wherein the interior cavity includes internal baffles configured to direct a flow of the upwelling pore fluids,
wherein a geotextile is anchored to a first internal baffle of the internal baffles and a second internal baffle of the internal baffles to create a plurality of separate reagent zones within the interior cavity comprising a first reagent zone and a second reagent zone; and
wherein a flow constrictor comprising a polymer is attached to a third internal baffle of the internal baffles within the first reagent zone.

2. The submersible reactive treatment cell according to claim 1, wherein the impermeable sidewall comprises a geomembrane-supported geosynthetic clay liner.

3. The submersible reactive treatment cell according to claim 1, further comprising at least one of the one or more treatment reagents, wherein the at least one of the one or more treatment reagents comprises one or more composite particles having:
    a core; and
    a sealant layer at least partially encapsulating the core, the sealant layer comprising a reactive material that is capable of removing one or more contaminants from the upwelling pore fluids,
    wherein the one or more composite particles have a water permeability that is effective for treating the upwelling pore fluids.

4. The submersible reactive treatment cell according to claim 1, wherein the one or more treatment reagents are replaceable and contained within an exchangeable reagent cartridge present within the interior cavity.

5. The submersible reactive treatment cell according to claim 1, wherein the housing comprises an exchangeable cartridge containing the one or more treatment reagents, the submersible reactive treatment cell further comprising a boot portion dimensioned to sealably receive a lower end of the exchangeable cartridge and releasable fasteners for securing the exchangeable cartridge in the boot portion.

6. The submersible reactive treatment cell according to claim 1, further comprising at least one sensor probe for detecting at least one condition of the submersible reactive treatment cell or the one or more treatment reagents contained therein, or the upwelling pore fluids flowing therethrough.

7. A sediment capping system comprising:
    a submersible reactive treatment cell according to claim 1 positioned on a permeable supporting layer consisting of a sediment bed, a drainage blanket, or permeable layer of composite particles; and
    an impermeable capping layer on an upper surface of the permeable supporting layer between a body of water and a sediment surface, and as a seal around a perimeter of the submersible reactive treatment cell.

8. The sediment capping system of claim 7, wherein the permeable supporting layer is a permeable layer comprising composite particles having a conductivity of from $1\times10^{-1}$ to $1\times10^{-6}$ cm/sec.

9. The sediment capping system of claim 7, wherein the impermeable capping layer comprises a layer of composite particles having a solid core and a hydratable sealant layer at least partially encapsulating the solid core, the impermeable capping layer having a conductivity of $1\times10^{-7}$ cm/sec or less.

10. The sediment capping system of claim 7, further comprising:
    a removable impermeable cover for a top of the housing, the removable impermeable cover having an outlet; and
    a conduit for fluid communication between the outlet and a vacuum pump.

11. A method of incorporating the submersible reactive treatment cell of claim 1 into a sediment capping system, the method comprising the steps of:
    applying a permeable blanket or layer to a sediment surface to form a permeable supporting layer;
    positioning the permeable floor layer of the submersible reactive treatment cell on the sediment surface or permeable supporting layer; and
    applying composite particles on the sediment surface or the permeable supporting layer between a body of water and the sediment surface, and around a perimeter of the submersible reactive treatment cell, the composite particles having a solid core and a hydratable sealant layer at least partially encapsulating the solid core, to form an impermeable capping layer.

12. A method of retrofitting a submersible reactive treatment cell into a prior existing sediment capping system having an impermeable cap layer separating a body of water from a permeable supporting layer,
    the submersible reactive treatment cell comprising:
        a housing including an impermeable sidewall defining an interior cavity, the interior cavity adapted to house one or more treatment reagents capable of treating upwelling pore fluids flowing through the interior cavity;
        a permeable ceiling layer connected to a top surface of the impermeable sidewall, the permeable ceiling layer comprising a geogrid outer ceiling layer and a non-woven geotextile inner ceiling layer; and
        a permeable floor layer connected to a lower surface of the impermeable sidewall, the permeable floor layer comprising a geogrid outer floor layer and a non-woven geotextile inner floor layer having a permeability adapted for retaining the one or more treatment reagents within the interior cavity during submersion, and for receiving and permitting passage of the upwelling pore fluids into the interior cavity of the housing;
    the steps comprising:
    removing a section of the impermeable cap layer from the prior existing sediment capping system to create a hole in the impermeable cap layer that extends to the permeable supporting layer or to a sediment bed;
    inserting the submersible reactive treatment cell into the hole and positioning the permeable floor layer of the submersible reactive treatment cell directly on an upper surface of the permeable supporting layer; and
    installing composite particles around a perimeter of the submersible reactive treatment cell to form a seal around the perimeter, the composite particles having a solid core and a hydratable sealant coating at least partially encapsulating the solid core, to form an impermeable layer to reinforce and patch the impermeable cap layer around the perimeter of the submersible reactive treatment cell.

13. The method of claim 11, wherein the permeable supporting layer comprises the composite particles forming the impermeable capping layer having a conductivity of from $1\times10^{-1}$ to $1\times10^{-6}$ cm/sec.

14. The method of claim 11, wherein the housing comprises an exchangeable cartridge containing the one or more treatment reagents, the submersible reactive treatment cell further comprising a boot portion dimensioned to sealably receive a lower end of the exchangeable cartridge and releasable fasteners for securing the exchangeable cartridge into the boot portion.

15. A method of treating a contaminated pore fluid with the sediment capping system of claim 7, further comprising treating the upwelling pore fluids wherein the upwelling pore fluids include the contaminated pore fluid.

16. A method of capping a sediment bed using the sediment capping system of claim 10, the method comprising:
    positioning the submersible reactive treatment cell on the sediment bed or the permeable supporting layer, the submersible reactive treatment cell having the removable impermeable cover installed and the outlet in fluid communication with the vacuum pump;

applying impermeable composite particles on the sediment bed or the permeable supporting layer and around a perimeter of the submersible reactive treatment cell to form the seal;

drawing a vacuum on the interior cavity for a period of time to remove at least some of the upwelling pore fluids; and subsequently removing the removable impermeable cover to allow the upwelling pore fluids remaining to daylight through the submersible reactive treatment cell.

17. A method of using a submersible reactive treatment cell according to claim 1, modifying the flow of the upwelling pore fluids flowing within a sediment bed below a body of water, the sediment bed being capped by an impermeable cap layer separating the sediment bed from the body of water for at least a portion of the sediment bed, the method comprising:

identifying a target area of the sediment bed or impermeable cap layer beneath the body of water to which the flow of the upwelling pore fluids is to be directed;

removing a portion of the impermeable cap layer to create a hole in the impermeable cap layer in or near the target area;

inserting the submersible reactive treatment cell through the body of water and into the hole in the impermeable cap layer such that the permeable floor layer of the submersible reactive treatment cell is in fluid communication with the sediment bed below the impermeable cap layer; and sealing the perimeter of the submersible reactive treatment cell to a remainder of the impermeable cap layer, whereby the flow of the upwelling pore fluids is redirected laterally within the sediment bed beneath the impermeable cap layer to the target area by hydraulic flow paths in the target area.

18. The method of claim 17 wherein the permeable floor layer of the submersible reactive treatment cell is in fluid communication with an intermediate permeable layer that is in fluid communication with the sediment bed below the impermeable cap layer.

* * * * *